United States Patent
Hickman et al.

(10) Patent No.: US 8,380,349 B1
(45) Date of Patent: Feb. 19, 2013

(54) METHODS AND SYSTEMS FOR PROVIDING INSTRUCTIONS TO A ROBOTIC DEVICE

(75) Inventors: Ryan Hickman, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/283,369

(22) Filed: Oct. 27, 2011

Related U.S. Application Data

(60) Provisional application No. 61/483,291, filed on May 6, 2011.

(51) Int. Cl.
*G05B 19/04* (2006.01)
*G05B 15/00* (2006.01)

(52) U.S. Cl. ........ 700/250; 700/247; 700/253; 700/258; 700/259; 701/24; 701/25

(58) Field of Classification Search .................. None
See application file for complete search history.

(56) References Cited

U.S. PATENT DOCUMENTS

| | | | | |
|---|---|---|---|---|
| 4,130,873 A * | 12/1978 | Fioretta et al. | ................ | 700/245 |
| 6,076,025 A * | 6/2000 | Ueno et al. | .................... | 701/23 |
| 6,529,802 B1 * | 3/2003 | Kawakita et al. | ............ | 700/245 |
| 7,751,936 B2 * | 7/2010 | Kim | ............................. | 700/245 |
| 7,813,835 B2 * | 10/2010 | Fujita et al. | ................... | 700/245 |
| 7,911,477 B2 * | 3/2011 | Arnold et al. | ................. | 345/581 |
| 2006/0195598 A1 | 8/2006 | Fujita et al. | | |
| 2008/0243305 A1 | 10/2008 | Lee et al. | | |
| 2010/0145512 A1 | 6/2010 | Flessas | | |
| 2011/0077802 A1 | 3/2011 | Halloran et al. | | |

FOREIGN PATENT DOCUMENTS

WO 2008070208 6/2008

OTHER PUBLICATIONS

What is RoboEarth?, http://www.roboearth.org/.

* cited by examiner

*Primary Examiner* — Khoi Tran
*Assistant Examiner* — Bao Long T Nguyen
(74) *Attorney, Agent, or Firm* — McDonnell Boehnen Hulbert & Berghoff LLP

(57) ABSTRACT

Embodiments disclose methods and systems for providing instructions to a robot device. The method may be executable to receive information from a robotic device and determine data responsive to the information. The method may also be executable to determine an order to send the data to the robotic device, where data associated with robot functionality to be performed at a first time is given a first priority and data associated with robot functionality to be performed at a subsequent time is given a second priority. The method is further executable to receive information indicating an amount of available memory on the robotic device and to provide the robotic device an amount of the data responsive to the information that is storable in the amount of available memory on the robotic device and in an order such that data that pertains to the first priority is sent first.

20 Claims, 11 Drawing Sheets

ID
METHODS AND SYSTEMS FOR PROVIDING INSTRUCTIONS TO A ROBOTIC DEVICE

CROSS-REFERENCE TO RELATED PATENTS AND PATENT APPLICATIONS

This patent application claims priority to U.S. Application No. 61/483,291, filed on May 6, 2011, the contents of which are entirely incorporated herein by reference, as if fully set forth in this application.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

In examples, a method is provided that may be executable to receive information from a robotic device that may have a mechanical actuator and determine data responsive to the information, wherein the data may include instructions executable by the robotic device. The method may also be executable to determine an order to send the data to the robotic device, where data associated with robot functionality to be performed at a first time may be given a first priority and data associated with robot functionality to be performed at a subsequent time may be given a second priority. The first priority may be higher than the second priority. The method is further executable to receive information indicating an amount of available memory on the robotic device and to provide the robotic device an amount of the data responsive to the information that is storable in the amount of available memory on the robotic device and in an order such that data that pertains to the first priority is sent first, wherein the providing is performed by a computing system having a processor and memory.

In other examples, a system is provided that may include a robotic device that may have a mechanical actuator. The system may also include a computing system having a non-transitory computer-readable medium. The system may also include program instructions stored on the non-transitory computer-readable medium and executable by at least one processor to receive information from a robotic device and determine data responsive to the information. The program instructions may also be executable to determine an order to send the data to the robotic device, where data associated with robot functionality to be performed at a first time may be given a first priority and data associated with robot functionality to be performed at a subsequent time may be given a second priority. The first priority may be higher than the second priority. The program instructions may be further executable to receive information indicating an amount of available memory on the robotic device and to provide the robotic device an amount of the data responsive to the information that is storable in the amount of available memory on the robotic device and in an order such that data that pertains to the first priority is sent first.

Embodiments may include a non-transitory computer-readable medium having stored thereon instructions executable by a computing device to cause the computing device to perform a number of functions. The functions include receiving information from a robotic device and determine data responsive to the information. The functions may also include determining an order to send the data to the robotic device, where data associated with robot functionality to be performed at a first time may be given a first priority and data associated with robot functionality to be performed at a subsequent time may be given a second priority. The first priority may be higher than the second priority. The functions may further include receiving information indicating an amount of available memory on the robotic device and providing the robotic device an amount of the data responsive to the information that is storable in the amount of available memory on the robotic device and in an order such that data that pertains to the first priority is sent first.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
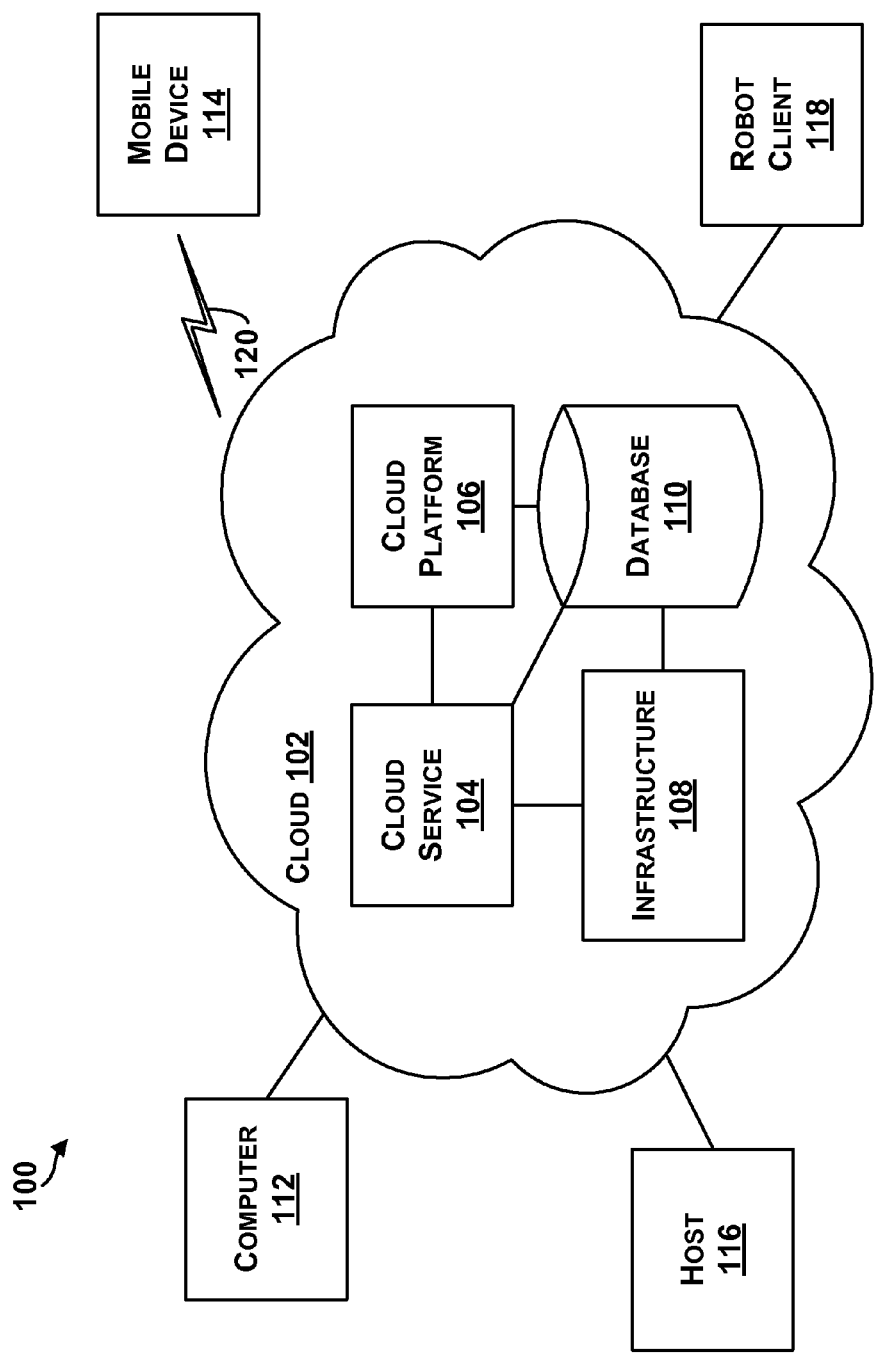
FIG. 1 is an example system for cloud-based computing.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control by a robot. A robot may perform any actions or queries to the cloud as described herein based on contextual or situational information.

In some examples, rather than require a robot's knowledge base to be stored onboard the robot, embodiments enable robots to store and access data at an external location, such as on a server and/or computing device. The external location may receive data and/or or requests from one or more robots. A server may store received data from one or more robots and/or distribute all or part of the stored data to one or more robots so as to create a common knowledge base amongst the robots, where robots can obtain instructions and/or data.

When needed, a robot may request data from the cloud. The cloud may respond by sending the requested data. For example, if a robot needs an updated map of an area, the robot may request the updated map from the cloud and, in response, receive the updated map. In embodiments where the robot may not have enough available memory to receive an entire map, a subset of the map may be sent to the robot based on an area of the map surrounding the robot at the time of the request, for example. In this way, the robot may obtain data that the robot may not have otherwise been able to store in onboard memory. This may allow the robot to function more efficiently by being able to avoid obstacles that may have otherwise hindered the robot's mobility, safety, and/or general operation, for example.

In embodiments, the cloud may perform one or more steps before responding to a request for data from a robot. For example, a robot may request computer-executable instructions to navigate an area. However, the robot may have limited processing capabilities. Therefore, the cloud may determine what computer-executable instructions may be within the robot's processing capabilities and determine an optimal set of computer-executable instructions that the robot may perform. The cloud may send instructions to the robot at one time or piecemeal based on how many of the instructions the robot is capable of performing at a given time. For example, the cloud may send the robot high-level data that may be needed right away and wait to send lower-level data until the lower-level data may be needed or until the robot has the capabilities to process the lower-level data.

1. Cloud Computing Architecture

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, sonar, optical sensors, biosensors, Radio Frequency identification (RFID) systems, Near Field Communication (NFC) chip, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
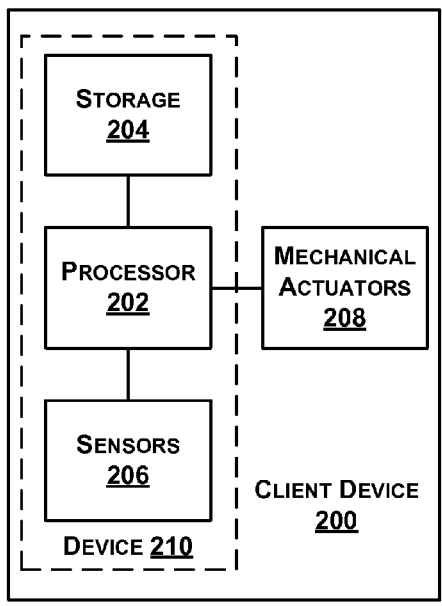
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
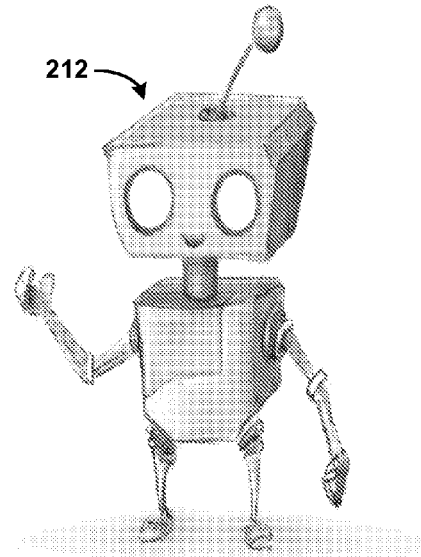
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
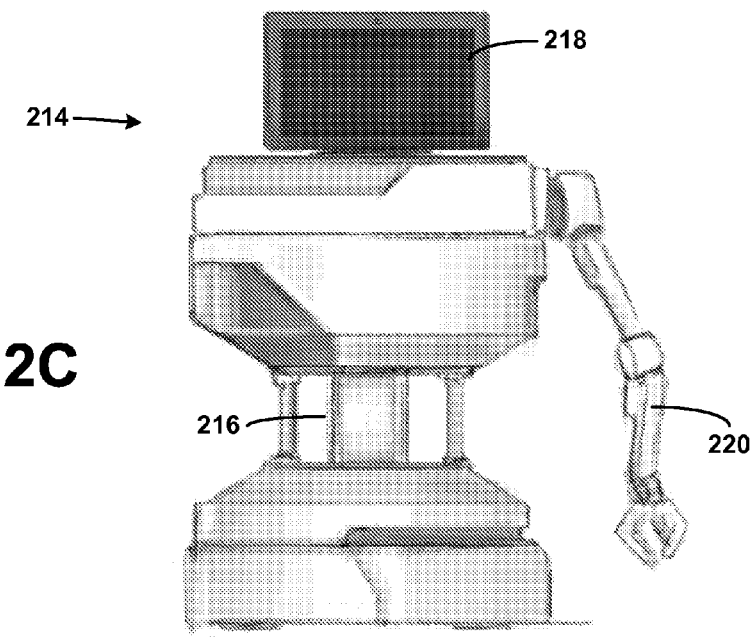
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
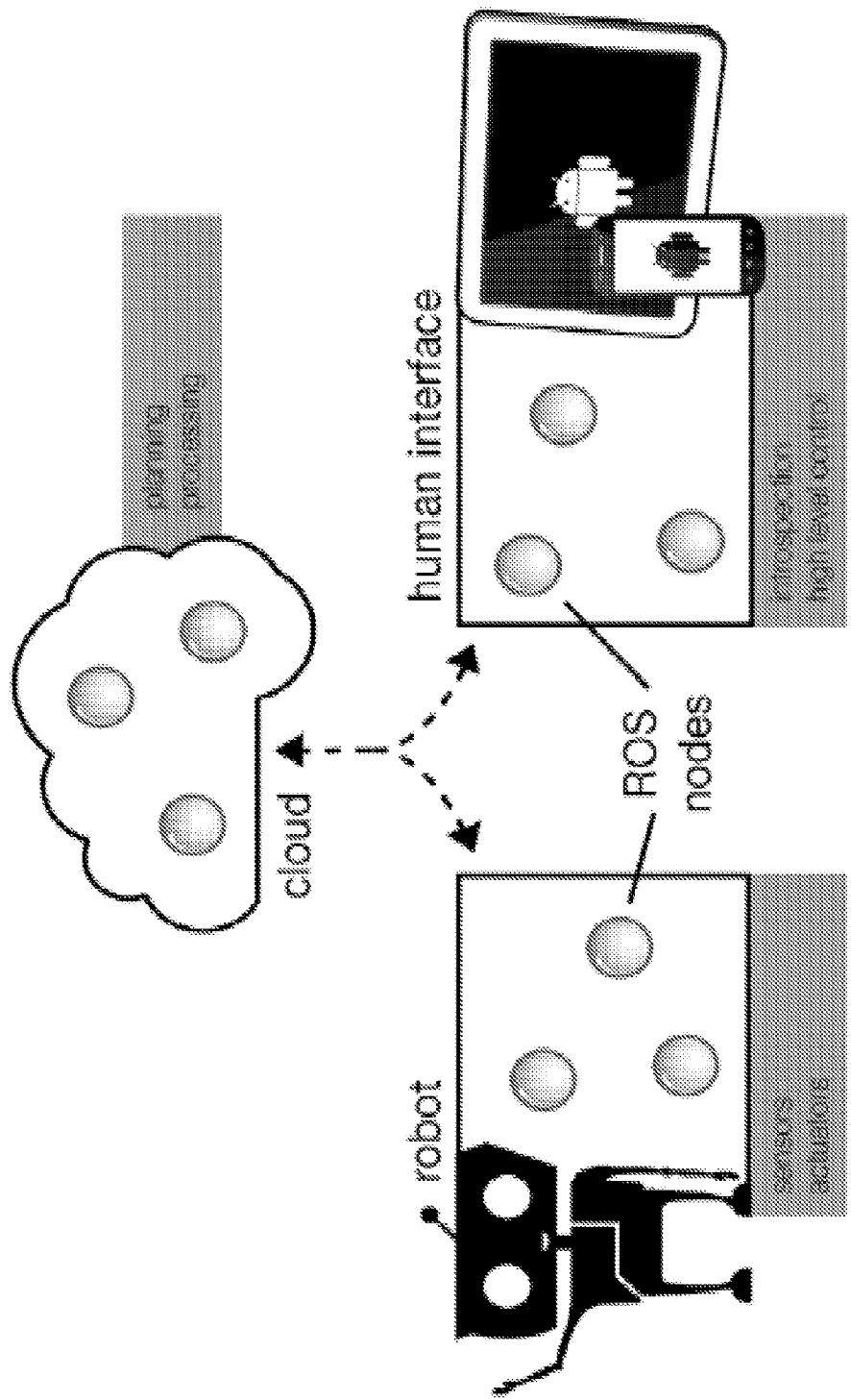
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
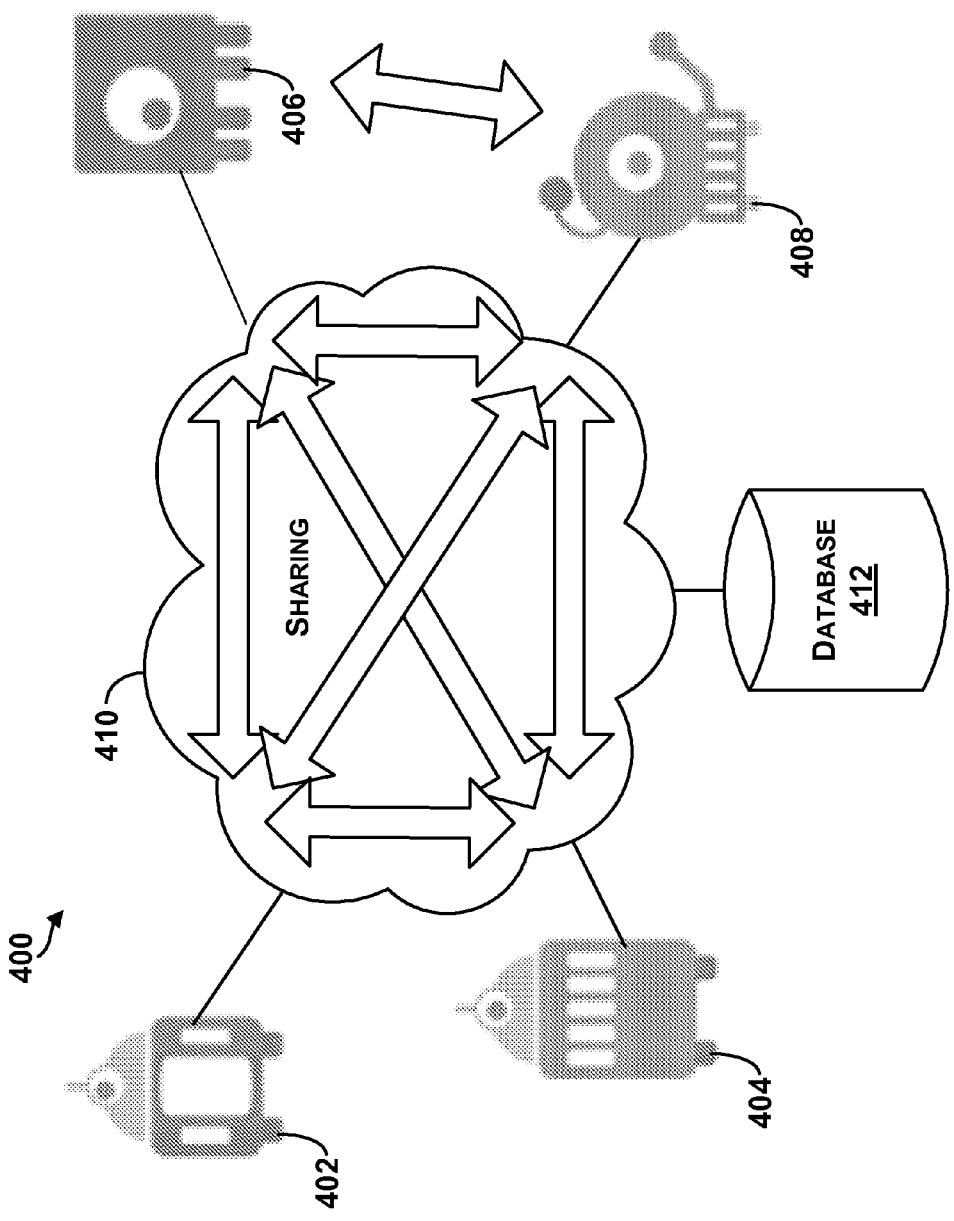
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Robot and Cloud Functions

As mentioned, robots (or any client computing device) may interact with the cloud to perform any number of functions. Example functions are described below.

a. Object Recognition

Figure 5:
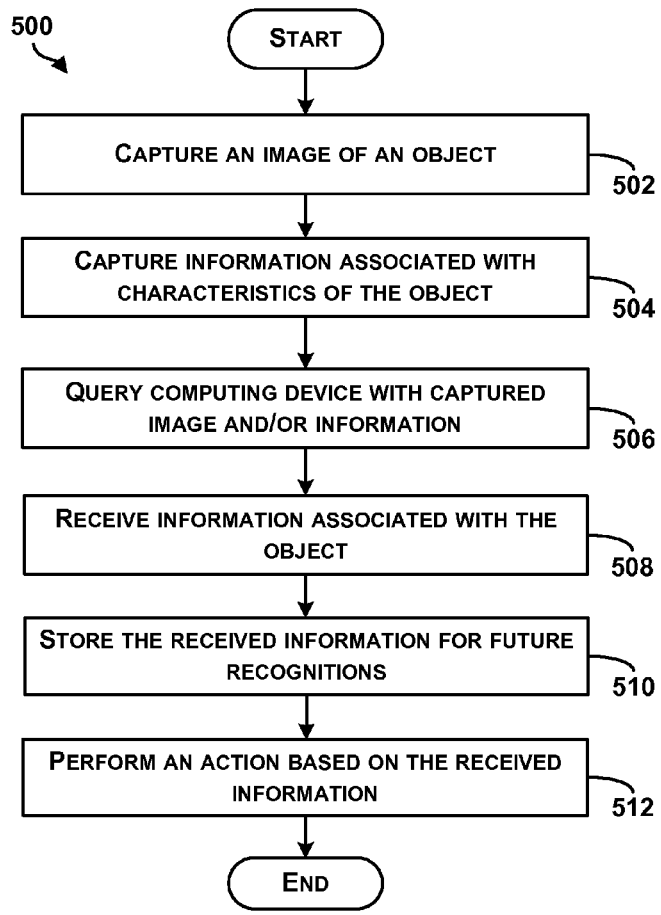
FIG. 5 is a block diagram of an example method of a robot interaction with the cloud to facilitate object recognition.

FIG. 5 is a block diagram of an example method of a robot interaction with the cloud to facilitate object recognition, in accordance with at least some embodiments described herein. Method 500 shown in FIG. 5 presents an embodiment of a method that, for example, could be used with the systems 100 and 400, for example, and may be performed by a device, such as another device illustrated in FIGS. 1-4, or components of the device. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capture an image of an object. In an example, a robot may capture many images of objects using any number of sensors, such as a camera (still pictures or video feeds), infrared projectors, etc.

At block 504, the method 500 includes capture information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 506, the method 500 includes query a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 508, the method 500 includes receive information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 512, the method 500 includes store the received information for future recognitions. For example, after receiving the information from the cloud, the robot would be able to recognize the object in the future enabling the robot to learn and adapt.

At block 512, the method 500 includes perform an action based on the received information. The action may vary based on a type of received information, or the query that is presented by the robot. As an example, a robot may capture an image of a coffee maker, provide the image to the cloud, and in response receive details about the coffee maker including an identity, model number, and instructions for use. The robot may then perform actions according to the instructions for use to use the coffee maker. As another example, a robot may open a refrigerator, take inventory of objects inside (e.g., capture images, identify objects), determine/receive recipes for possible meals based on the determined inventory, and suggest a meal based on items in the refrigerator.

As an example, the robot may query the cloud to identify an object and details of the object to enable the robot to interact with the object. If the received information is not fully accurate (e.g., the robot determines a different weight of the object), the robot can share this information with the cloud to update/modify a shared database in the cloud.

As an additional or alternative method for performing object recognition, objects may be tagged with a type of identifier (e.g., radio frequency identification (RFID) chip, near field communication chip (NFC), bar code, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (RFID in an employee's ID badge) to perform tracking of objects.

Figure 6:
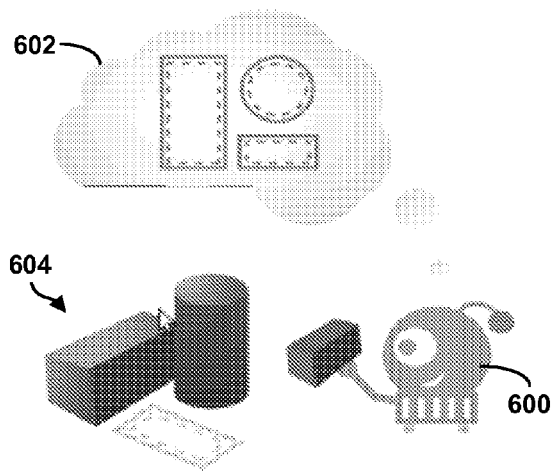
FIG. 6 is an example conceptual illustration of a robot interacting with a cloud to perform object recognition and interaction.

FIG. 6 is an example conceptual illustration of a robot 600 interacting with a cloud 602 to perform object recognition and interaction, or other functions as described in FIG. 5. The robot 600 may interact with an object (such as any of objects 604), and interact with the cloud 602 as described above to further interact with the object.

In some examples, the method 500 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 500, the robot may execute software to perform function calls, such as GetObject( ) which may return information associated with an object (e.g., a cereal box), or PickUpObject( ) which may cause the robot to pick up the object. Enabling function calls and operation of robots through the cloud facilitates control and operation of the robot without having to control or operate various sensors/mechanical aspects of the robot, for example.

b. Mapping Functions

Figure 7:
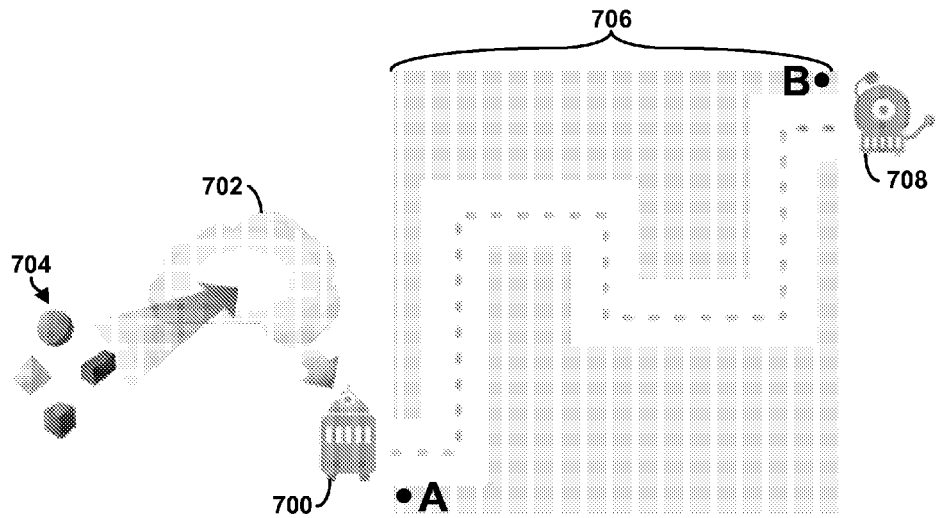
FIG. 7 is an example conceptual illustration of a mapping function.

FIG. 7 is an example conceptual illustration of a mapping function. A robot 700 may interact with a cloud 702 to perform functions as described in FIG. 5, for example, such as to perform object recognition queries of objects 704. The robot 700 may traverse through an area 706 in any number of pathways so as to map the area. As an example, the robot 700 may be configured to roam around an area in which the robot 700 is located to create a map of the area 706 (e.g., room of a house) with the aid of cloud processing. As the robot 700 navigates through the area 706 using any number of sensors to determine nearness to objects or capture images of objects, the robot 700 may relay data collected from various sensors to the cloud 702. The robot 700 may use sensors to return still pictures, video, location information, and distance information to the cloud computing system.

To perform mapping functions, the robot 700 may traverse through the area 706 capturing images using a range camera, video camera, etc., and send the data to the cloud 702. The robot 700 (or servers in the cloud 702) may identify objects within the data and provide annotations (such as mass, shape, material, etc.) of the objects. A computerized map may be generated to represent the area 706, and computer graphics (e.g., low resolution graphics) can be used to represent identified objects.

As another robot and cloud function, computer graphics within the generated map of the area 706 may be replaced with high resolution images of the objects. For example, the robot 700 may capture an image of a couch, and the cloud 702 may identify a specific model of the couch, and perform a search within a database to locate/identify a retailer that manufactures/sells the couch. A server in the cloud 702 may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Figure 8:
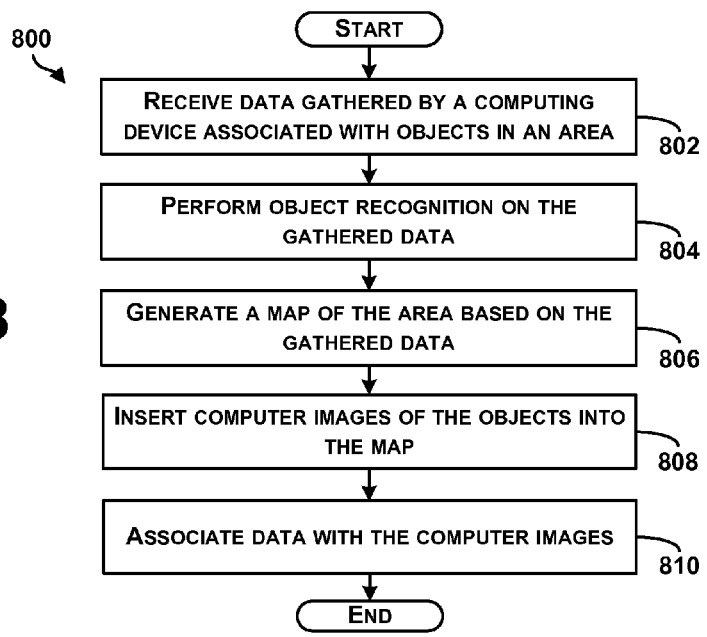
FIG. 8 is a block diagram of an example method for mapping of objects in an area or mapping an area.

FIG. 8 is a block diagram of an example method for mapping of objects in an area or mapping an area, in accordance with at least some embodiments described herein. Method 800 shown in FIG. 8 presents an embodiment of a method that, for example, could be used with the systems 100 and 400, for example, and may be performed by a device, such as another devices illustrated in FIGS. 1-4, or components of the device. The various blocks of method 800 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 802, the method 800 includes receive data gathered by a computing device associated with objects in an area. For example, a robot may traverse an area and capture raw data (e.g., such as point map data) and images (e.g., still or video feed) using a range camera, video camera, still camera, etc. The robot may provide the gathered data to the cloud, which may receive the gathered data. Additionally, the cloud may receive gathered metadata associated with the objects in the area, such as a time the data was collected, a location (e.g., GPS location) at which the data was collected, or other characteristics regarding when/how the data was collected.

At block 804, the method 800 includes perform object recognition on the gathered data. A server on the cloud may interpret objects, and further, shapes can be matched with a three-dimensional warehouse or database of objects to identify representations of the point maps. The server may use any type of object recognition methods, such as by matching edges, colors, variances, etc., of the gathered data to known objects within a database. The objects within the database may have associated metadata indicating characteristics of the objects.

Thus, the server can perform object extraction to identify and extract objects from the received data. The server can further localize the objects precisely in a map and provide annotations for the objects. Example annotations include mass, shape, material, etc. of the object. Annotated objects may be stored and shared through a global object database, such as, the database 412 in FIG. 4.

At block 806, the method 800 includes generate a map of the area based on the gathered data. For example, the server may use locations of the data collected as well as times the data was collected to interpret a path traversed by the robot and to create a conceptual map. The map may be further generated based on circumstantial data of the recognized objects, such as size and shape of the object. If an object has a known size and shape, and the location of the object is known, an estimated area at which the object is present can be determined.

At block 808, the method 800 includes insert computer images of the objects into the map. For example, the server may retrieve a computer image of the recognized object (e.g., television), and insert the object into the location on the generated map at which the object is present.

At block 810, the method 800 includes associate data with the computer images. For example, the server may associate any number of metadata with the computer image, or may alternatively, retrieve metadata or other high resolution images representing the object from a retailer's database for insertion into the computer generated map. As described above, an image of a couch may be captured, and the server may identify a specific model of the couch, and perform a search within a database to locate/identify a retailer that manufactures/sells the couch. A server in the cloud may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Thus, in some examples, a robot builds shapes and appearances of all objects in a scene and performs object recognition as possible (with the help of the cloud) to provide an annotated map of objects. Raw data is gathered (e.g., point map) and used with camera data (e.g., indicates color/texture of objects) to interpret objects, and further, shapes can be matched with a 3D warehouse of objects to identify representations of the point clouds.

Figure 9A:
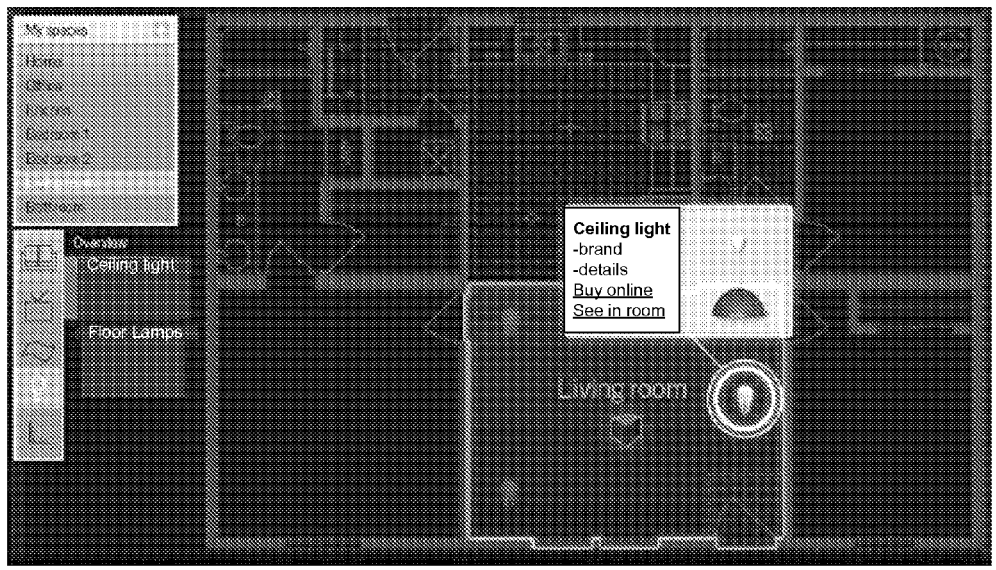
FIGS. 9A-9B are example interfaces illustrating a map of an area, and objects in the map.
Figure 9B:
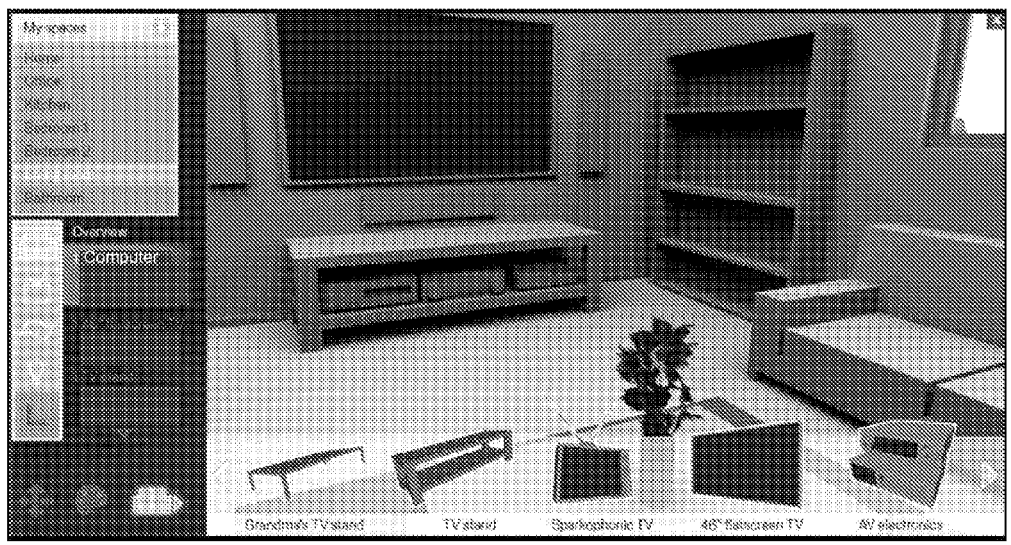

FIGS. 9A-9B are example interfaces illustrating a map of an area, and objects in the map. For example, in FIG. 9A, a home has been outlined (e.g., in a blueprint format) to show different rooms in the home. Items in the home may also have been mapped. FIG. 9B illustrates an example interface illustrating mapping of objects in a room. In some examples, the interfaces in FIGS. 9A-9B, and methods described herein, may enable a user to determine configurations of rooms and objects in the rooms. As one example, a user may be in a store and identify a few television stands that the user would like to purchase; however, the user would like to see how the television stands look/fit into the room configuration. The user may capture some images of the television stands using a device, cause the device to perform object recognition (e.g., using the method 500 in FIG. 5), access the interface in FIG. 9A to select a room in which to place the television stand, and access the interface in FIG. 9B to insert the new television stand in place of an old television stand (e.g., swap out the old television stand with the new television stand and place the television and peripherals into a desired configuration). The example interfaces in FIGS. 9A-9B may be used to maneuver computer generated objects in a room, for example.

In further examples, the interfaces in FIGS. 9A-9B may provide information (e.g., metadata) regarding rooms or objects in the rooms as determined during a mapping of the room. For example, the interface in FIG. 9A may indicate details regarding a ceiling light, such as a brand name, a model number, details regarding light bulbs used by the ceiling light, etc., and the metadata may provide links to purchase the ceiling light or accessories online, or a link to see the ceiling light in the room, such as a link to the example interface in FIG. 9B.

c. Navigation Functions

Referring back to FIG. 7, in one example, the robot 700 may receive instructions to navigate from point A to point B across the area 706. The robot 708 may have completed this navigation previously, and may have uploaded information regarding a possible navigation pathway to the cloud. The robot 708 may have documented objects along the pathway, and also, possible obstructions as well. The robot 700 may query the cloud requesting navigation instructions to traverse from point A to point B (e.g., a map), and may receive in response, the navigation pathway shown in FIG. 7 as previously traveled by the robot 708. In this manner, the robots may share information to enable learning of the area 706.

In addition, the robot 700 may have limited memory, and in one example, to enable and manage updates, a server may include or store data to be provided to the robot 700. For instance, the robot 700 may not download "the entire world" of data, but rather, may download data representing immediate surroundings into a local cache to perform actions, such as to traverse through a portion of the area 706. The robot 700 may download additional data when needed. Furthermore, downloads can occur from the server to the robot 700, or through peer-to-peer sharing (e.g., from the robot 708 to the robot 700). Still further, basic instructions for mobility, safety, and general robot operation can be stored on-board the robot 700, while instructions for higher-level functionality may be stored in the cloud 702 and accessed by the robot 700 as needed. In some examples, the robot 700 can use "Just in Time" downloading where high level data can be downloaded first, followed by lower level data streamed as needed. In some examples, providing business logic stored in the cloud 702 enables fleet-wide upgrades to all robots.

In addition, "slug" trails may be used for shared information (i.e., information that may be used for object recognition). A slug trail may be indicative of previous requests and matching responses. Thus, in a multi-node system, the request/response can be cached so that future requests hit an answer sooner in path. For example, if the robot 700 is navigating through the area 706 and notices a hallway is blocked, the robot 700 can publish an update on the pathway so that other robots learn of the obstacle and other problems/constraints, and may request/receive an alternate pathway. Any interaction that the robot 700 experiences can be published to the cloud so that the robot 700 logs interactions to be shared amongst all robots. Specific locations may trigger robots to download new information. For example, when entering a new room, data about the room may be retrieved that was collected by another robot.

d. Inventory/Differential Functions

Figure 10:
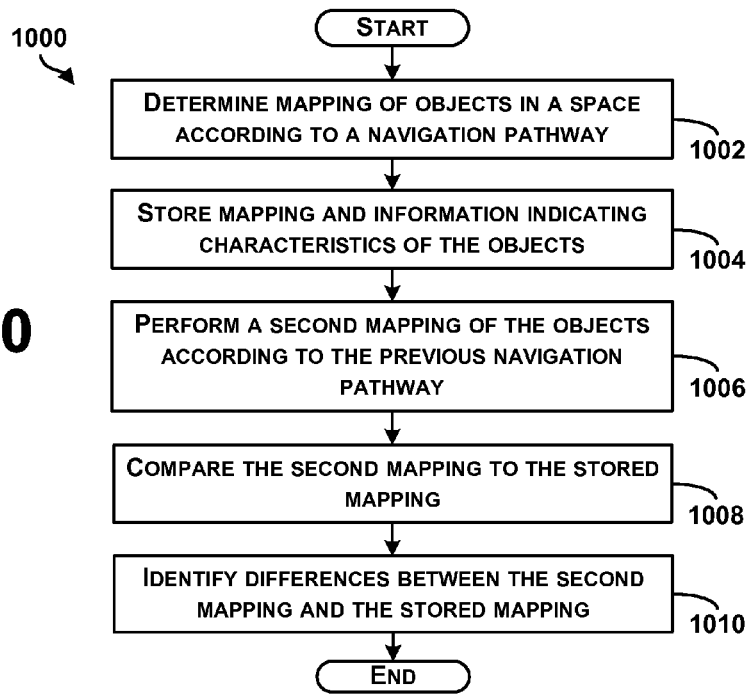
FIG. 10 is a block diagram of an example method for mapping of objects in an area and performing inventory of objects.

FIG. 10 is a block diagram of an example method for mapping of objects in an area and performing inventory of objects, in accordance with at least some embodiments described herein. Method 1000 shown in FIG. 10 presents an embodiment of a method that, for example, could be used with the systems 100 and 400, for example, and may be performed by a device, such as another devices illustrated in FIGS. 1-4, or components of the device. The various blocks of method 1000 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1002, the method 1000 includes determine mapping of objects in a space according to a navigation pathway. For example, a robot may move through an area and perform object recognition and generate a map, as described above using method 500 in FIG. 5 and method 800 in FIG. 8. The robot may be configured to follow a predetermined navigation pathway through an area, or may follow a random navigation pathway through the area. The robot may store or associate the navigation pathway with the determined mapping of the area, so that a record is formed of the navigation pathway used to determine the mapping. In one instance, based on the navigation pathway, the mapping may be different (e.g., a robot may not map an entirety of an area or take account a full inventory of all objects in an area).

The mapping of the area may be, in one example, an inventory of objects in the area. As the robot traverses through the area capturing images and performing object recognition, the robot may determine what objects are present, and determine locations of objects in the area.

At block 1004, the method 1000 includes store mapping and information indicating characteristics of the objects. For example, the robot may store the mapping locally on memory of the robot or within the cloud. The robot may further store associated information indicating characteristics of the objects with the mapping of the objects, such as, metadata describing details of the objects (weight, color, model number, size, shape, etc.).

At block 1006, the method 1000 includes perform a second mapping of the objects according to the previous navigation pathway. For example, at a later time, the robot may perform another mapping of the area using the same navigation pathway so as to take an inventory of the area at the later time. The robot may follow the same (or substantially same) navigation pathway previously used so that the same (or substantially same) mapping of the area and objects in the area can be determined.

At block 1008, the method 1000 includes compare the second mapping to the stored mapping, and at block 1010, the method 1000 includes identify differences between the second mapping and the stored mapping. By comparing the two mappings, differences between the mappings can be identified to determine differences in the inventoried objects.

As an example using the method 1000 of FIG. 10, a user may configure an area (e.g., bedroom) into a default configuration (e.g., where all clothes are picked up off the ground, items are arranged and the room is cleaned). The user may request the robot to perform a mapping and inventory of objects in the bedroom with the bedroom in the default configuration. Following, if the user has misplaced an item, the user may request the robot to perform a new inventory of the room, and the new inventory can be compared to the default inventory to determine what changes have been made to the bedroom (e.g., what objects are not in the default location).

As another example using the method 1000 of FIG. 10, a user may configure a stock room at a retail store into a default configuration (e.g., all shelves are fully stocked). The user may request the robot to perform a mapping and inventory of objects in the stock room with the room in the default configuration. Following, the user may request the robot to perform a new inventory of the stock room to determine what items have been sold. The new inventory can be compared to the default inventory to determine what changes have been made to the stock room, such as, to indicate a current supply of items in the stock room that can be used to configure future orders. The default inventory map may thus be a benchmark map of the room in a clean state, so that subsequent maps can be performed to determine a differential between the benchmark and a current condition of the room.

Thus, in some examples, a robot may create an inventory of objects in a room or scene, along with a mapping of the objects to catalog all objects in the space and to store details of the objects (e.g., name, shape, color, last known location, etc.). The robot may have a navigation path that is followed to inventory a space, so that the same navigation path can be traversed to identify missing/new objects.

e. Voice Recognition/Control

Figure 11:
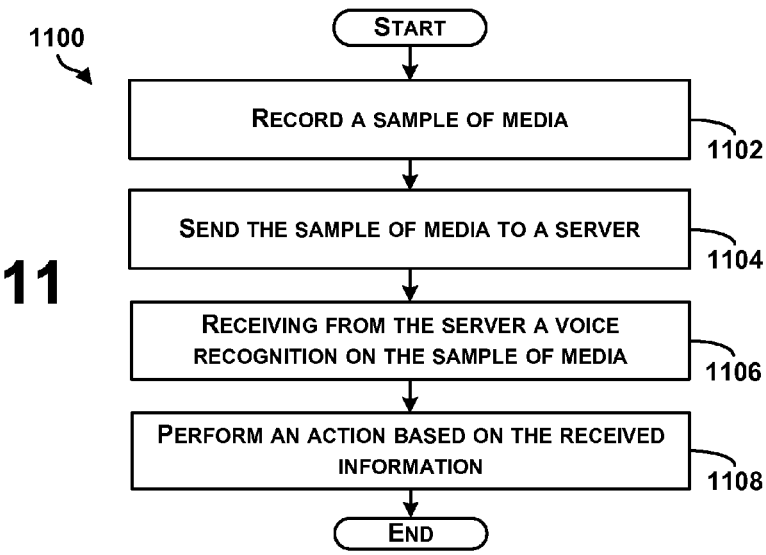
FIG. 11 is a block diagram of an example method for performing voice recognition/control by a robot, all arranged in accordance with at least some embodiments described herein.

FIG. 11 is a block diagram of an example method for performing voice recognition/control by a robot, in accordance with at least some embodiments described herein. Method 1100 shown in FIG. 11 presents an embodiment of a method that, for example, could be used with the systems 100 and 400, for example, and may be performed by a device, such as another devices illustrated in FIGS. 1-4, or components of the device. The various blocks of method 1100 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1102, the method 1100 includes record a sample of media. For example, a user may interact with a robot by speaking to the robot, and the robot may record the speech of the user. The robot may record samples of speech from other areas as well (e.g., televisions, radio, etc.) and of other types of media, such as music, video, live performances, etc.

At block 1104, the method 1100 includes send the sample of media to a server. For example, the robot may be configured to communicate with a server (e.g., the "cloud"), and may send the sample of media using wired or wireless communication to the server.

At block 1106, the method 1100 includes receiving from the server a voice recognition on the sample of media. The server may use any number of known techniques for performing voice recognition, and may provide a response to the robot. The voice recognition response may include a textual equivalent of the speech, such as when the server performs speech to text processes.

At block 1108, the method 1100 includes perform an action based on the received information. In one example, the voice recognition response may also include a command or instructions indicating actions for the robot to perform. In this example, the server may perform a voice recognition, and may further identify actions to be performed by the robot in response to the voice recognition. As a specific example, the user may speak "call John" to the robot. The robot may record the speech and send the speech sample to the server. The server may recognize the speech, and return a voice recognition response to the robot with instructions for the robot to call a user named John at the phone number 555-1234. The robot may then initialize a phone call to John using internal phone capabilities. If the robot is not equipped with a wired or wireless telephone, the voice recognition response may further include instructions to the robot for how to initialize the phone call, such as to provide a map to the robot of where a telephone is located, provide a navigation pathway to the robot to instruct the robot how to traverse to the telephone, provide instructions how to use the telephone to the robot, and provide the phone number of John to the robot.

f. Contextual/Situational Robot Functions

A robot may perform any actions or queries to the cloud as described herein based on contextual or situational information.

In an example, a robot may have information relating to a local environment in which the robot operates (e.g., a local map, a location, etc.) and this information can be used as constraints for recognition systems that are used to identify objects within captured data by the robot. For example, if the robot is in an office, the robot may access an "office" database of objects within the cloud to perform object or data recognitions. Thus, the robot may send to the cloud a query to determine or identify an object within gathered data, and the query may include contextual information, such as an indication of a location of the robot. The server may use the contextual information to select a database in which to search for a matching object.

Thus, in some examples, a robot may use location, or possible nearby objects as constraints into recognition systems to provide a context of the environment enabling object recognition to be performed using a subset or a limited set of nouns/verbs/objects to improve recognition accuracy.

As another example, the robot may operate with situational awareness such that a robot may inventory objects in a scene, and if given a command by a user, the robot can determine the content or interpret the meaning of the command based on a situation of the scene or by comparing with objects in the scene (e.g., command is to retrieve a cola from the refrigerator, and robot can use limited database warehouse of objects associated with "house" to quickly identify refrigerator/cola, etc.). The robot may be configured to use contextual as well as situational data to help perform decision making.

In still another example, a robot may perform actions using contextual/situational data, such as time of day, weather outside, etc. For example, at night a robot may be configured to move more slowly and make less noise to be quiet than as compared to operations during the day. In another example, in the morning a robot may offer coffee to a person as opposed to a soft drink. Other situational examples that may affect configurations of robot actions include if the weather is rainy, the robot may offer an umbrella to the person, or based on what a person is wearing, the robot may offer suggestions as to whether the person will be hot/cold due to weather. Thus, the robot may take context/situation into account, as well as whom the robot is interacting with when determining an appropriate response/function. Still further, a robot may make a sound of presence, intent, state, based on context/situations.

As still another example, a voice recognition database (or information from a voice recognition database) may be provided to a client device (e.g., robot) to enable the robot to perform voice/speech recognition locally. The voice recognition database may be provided based on a current state of the robot. As an example, if a robot is in an office setting, an office database for voice recognition may be provided to the robot to enable a voice recognition process to be performed more quickly than having the robot search within a database for all settings. Any situational or contextual information of the robot may be used to select a voice recognition database to provide to the robot. As other examples, a time of day, context of a conversation, location of the robot, etc. may be used individually or in combination to select a voice recognition database to provide to the robot.

5. Robot and Cloud Communication

Figure 12:
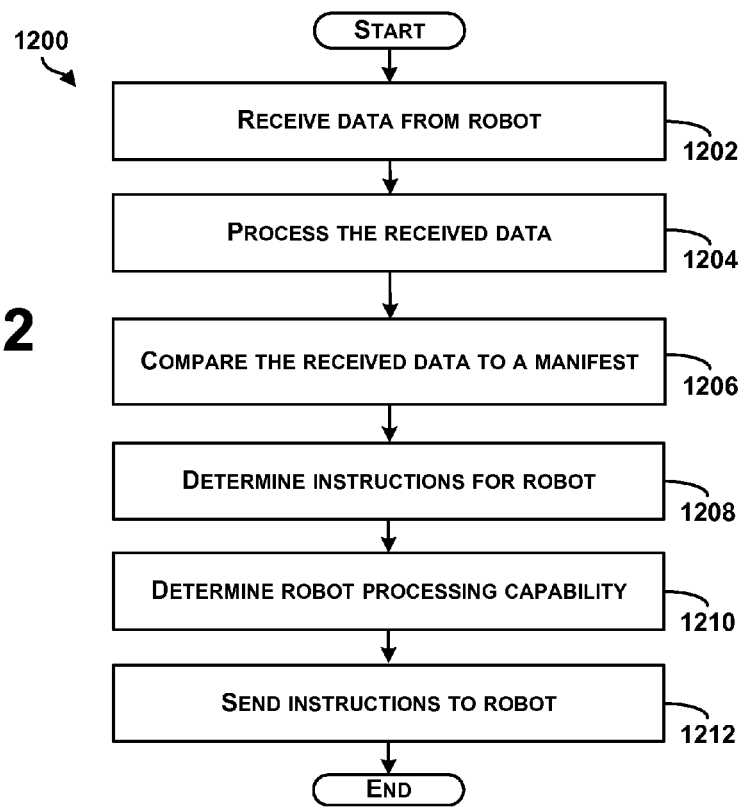
FIG. 12 is a block diagram of an example method for processing data from a robot.

As described above, robots are capable of communicating with a cloud to receive instructions. FIG. 12 is a block diagram of an example method for processing data from a robot, in accordance with at least some embodiments described herein. Method 1200, shown in FIG. 12, presents an embodiment of a method that, for example, could be used with the systems 100 and 400, and may be performed by a device, such as another device illustrated in FIGS. 1-4, or components of the device. The various blocks of method 1200 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive.

At block 1202, the method 1200 includes receive data from a robot. The type and form of the data that is received can vary in embodiments. For example, the received data may be in the form of a request from a robot. The request may be for data about the robot's environment or a request for computer-executable instructions that may allow the robot to perform a desired task, for example. The received data may also be in the form of information about the robot and/or the robot's environment, for example. Any or all of the data may be received by a server, cloud, or the like at periodic intervals and/or as the data is obtained.

For example, a robot may have limited memory, and therefore, may only store information about the robot's immediate surroundings. Should the robot venture outside of these immediate surroundings, the robot may not have enough information to continue to operate. Therefore, the robot may request data about the robot's new or changing surroundings from the server, cloud, or the like.

In embodiments, the robot may need to perform a task. Example tasks may include navigating to a location, opening a door, finding an object in an area, etc. However, due to memory and/or other limitations, the robot may not store the instructions onboard to perform the task. The robot may, therefore, request computer-executable instructions from to perform the task from the server, cloud, or the like.

The robot may also send information about the robot and/or the robot's environment to the server, cloud, or the like. For example, a robot may send a robot identifier, which identifies the robot. Example robot identifiers may include numeric, alphanumeric, or alphabetic identifiers. The robot identifier may be unique to an individual robot, model of robot, etc. Robot identifiers may be used to identify the robot to the cloud so that the cloud may determine what computer-executable instructions to send to the robot, for example.

The robot may also send to the server, cloud, or the like, information indicating or associated with one or more robot capabilities. Information about the robot capabilities may identify one or more specific characteristics of a robot. For example, information about the robot capabilities may include one or more of an amount of memory on the robot, an amount of available memory on the robot, available processing power at the robot, processing power of the robot, remaining battery life at the robot, latency between the robot and receiving device, etc. Information about the robot capabilities may also be used to identify what resources the robot has available for receiving data from the cloud, for example.

The robot may also send data about the robot's environment and surroundings in the form of location inputs to the server, cloud, or the like. Location inputs may identify the robot's environment including objects within an area, for example. The location inputs may be stored, sent to a cloud, and/or distributed to other robots, thereby allowing the robot to share the robot's knowledge with other entities without requiring the robot to store all of the knowledge in onboard memory.

In embodiments, location inputs may be obtained using any number of sensors such as optical sensors, GPS, microphones, etc. The sensors may be in direct or indirect communication with the robot. The amount of detail associated with the location data may vary (e.g., based on the sophistication of the sensors, size of the area, amount of memory at the robot for temporarily or permanently storing the location data, etc.)

At block 1204, the method 1200 includes process the received data. The processing may performed by a server, cloud, or the like and include a determination as to whether the received data is a request for data, such as computer-executable instructions, or is providing information about the robot and/or the robot's location. For example, if the received data is providing information about the robot and/or the robot's location, the processing at block 1204 may involve storing the provided information at the cloud and/or disseminating the information to other robots. If the received data is a request for data, the processing at block 1204 may involve determining what data may or may not be needed to continue the steps of the method 1200.

For example, a robot may be approaching a table and may request instructions on how to move around the table. The robot may send a robot identifier, such as a robot model number, and may also send location inputs including that the table is of a certain color, size, and is made out of a specific material, for example. Not all of the received data may be necessary for navigating around the table. Thus, the server, cloud, or the like may process the received data and determine that certain data (e.g., the robot model number, the request for instructions on how to move around the table, and the size of the table) may be needed to continue the steps of the method 1200.

At block 1206, the method 1200 includes compare the received data to a manifest. The comparison of the received data to the manifest may be performed by a server, cloud, or the like. In embodiments, the received data may include a robot identifier. The manifest may include robot specific details related to the robot identifier. For example, the manifest may include robot specifications related to a processor type, amount of installed memory, storage space, type of operating system, type of sensors available to the robot, what type of wheels are installed on the robot, what direction(s) the robot is able to move, etc.

In embodiments, a manifest may be stored on the server, and may be created by persons in industry, etc. Moreover, in embodiments, the manifest may be created based on inputs from one or more robots. The server, cloud, or the like may compare any of the received data to robot specific details within the manifest. Thus, for example, a server may compare a robot identifier received from a robot to a robot identifier associated with a manifest. In embodiments, the comparison may result in a match between the robot identifier received from the robot and the robot identifier associated with the manifest.

At block 1208, the method 1200 includes determine instructions for the robot. The instructions may be computer instructions that are executable by the robot. The instructions may be determined based at least in part on the data from the manifest.

Embodiments may store multiple sets of computer-executable instructions at a cloud. The computer-executable instructions may be specific or generic. Specific computer-executable instructions may be instructions that a robot having a specific operating system, processor type, robot identifier, etc., may perform. Generic computer-executable instructions may be instructions that any robot may perform such as how to stop, turn a certain direction, make an audible sound, etc. One or more specific and/or generic computer-executable instructions may be combined to accomplish a task.

In one example, location inputs may be received, which indicate that a table is a specific distance in front of the robot. This data may be processed by the server, cloud, or the like to determine that the robot should move so as to avoid the table. Based on the robot identifier, the manifest may indicate that the robot is limited to 16 kilobytes of memory and has the capability of turning in multiple directions. The method 1200 may be executable to use this data to determine that there are five different sets or combinations of computer-executable instructions that will allow the robot to avoid the table. These five different sets or combinations may vary in computational complexity, amount of time to perform, amount of processing power, number of instructions, etc. In embodiments, the method 1200 may be executable to identify an optimal set or combination of instructions. In this example, the robot has limited memory capabilities; therefore, the set of computer-executable instructions requiring the least amount of memory at the robot may be considered the optimal instructions.

At block 1210, the method 1200 includes determine robot processing capability. The robot's processing capability may relate to a number of computer-executable instructions the robot can perform in an amount of time. In embodiments, the processing capability may be determined at least in part by the robot capabilities received at block 1202. For example, the robot capability may indicate the amount of available memory on the robot, available processing power at the robot, remaining battery life at the robot, etc. Using this information, for example, a server, cloud, or the like may determine that a robot having a limited amount of memory may only be capable of performing a certain number of computer-executable instructions at one time.

At block 1212, the method 1200 includes send the instructions to the robot. In some embodiments, the entire set of instructions may be sent to the robot. However, in other embodiments, the robot may not be able to process the entire set of instructions due to processing limitations, memory limitations, or the like. Therefore, a subset of the instructions may be sent to the robot. In other embodiments, the determination of how many instructions to send to the robot may be performed at block 1210 or block 1212.

For example, if the robot is limited to 16 kilobytes of memory, and the optimal instructions require 25 kilobytes of memory, then any number of the optimal instructions up to, but not exceeding, the 16 kilobyte memory limitation may be sent to the robot. Once more memory becomes available, additional instructions may be sent to the robot. The additional instructions may be sent as soon as any memory becomes available, as soon as at least a predefined percentage or amount of the memory becomes available, or when the entire amount of memory becomes available at the robot. This process may continue until all instructions have been sent, the robot no longer needs to perform the instructions, a different set of instructions is requested based on new or updated robot capabilities or location inputs, etc., for example.

Embodiments may send computer-executable instructions according to a priority level. For example, a first priority may be given to high-level functions and a second priority may be given to low-level functions. High-level functions may involve computer-executable instructions that have a determined or predefined order of operation, for example. High-level functions may also include computer-executable instructions which are associated with the surroundings of the robot or which may result in an adverse action if not performed prior to one or more other computer-executable instructions. An example may be computer-executable instructions requiring a robot to stop before the robot falls off of a table. Low-level functions may involve computer-executable instructions having a lower order of operation than the high-level functions such as having the robot make a beeping sound prior to or while stopping, for example. The server may send second priority functions, such as low level functions, to the robot after the first priority functions have been completed or after enough memory at the robot becomes available to store the second priority functions. Memory at the robot may become available when one or more computer-executable instructions are executed by the robot, for example.

The method 1200 has been described in terms of receiving data from a robot at a server, cloud, or the like. In some examples, one or more intermediate devices may be used as a communication interface between the robot and the server, cloud, or the like. Example intermediate devices include a computing device such as cellular telephone, personal digital assistant, desktop computer, tablet computer, laptop computer, etc.

Figure 13:
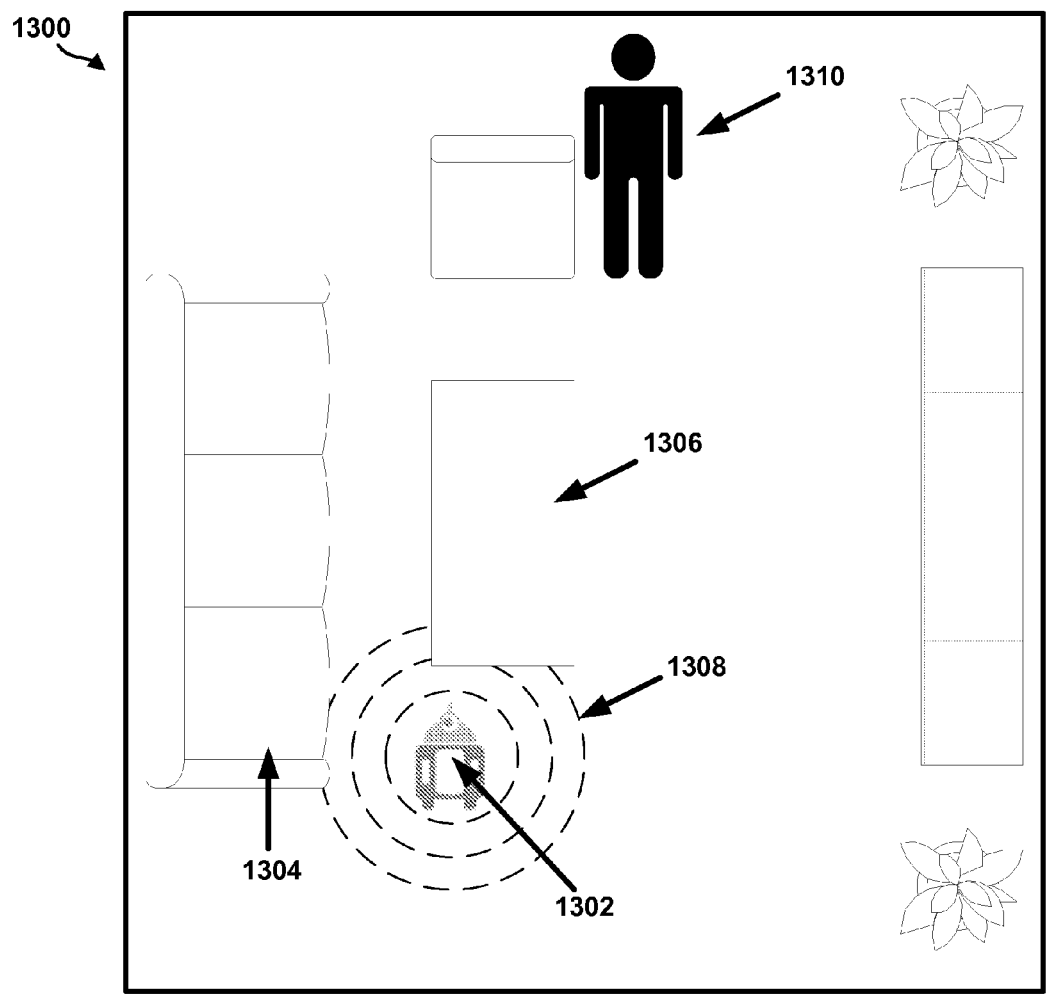
FIG. 13 is an example conceptual illustration of a robot navigating through an area.

FIG. 13 shows a conceptual illustration of a robot 1302 navigating through an area 1300. The area 1300 may be a room, as illustrated in FIG. 13, a grocery store, a state highway system, an outdoor area, etc. In embodiments, the robot 1302 may store a map of the area 1300 in memory. The map may also be stored in a cloud and/or on a computing device. The map may maintain dimensions or boundaries of the area 1300, a location of objects 1304, 1306 within the area 1300, etc.

One or more robots 1302 may be present in an area 1300. Each robot 1302 may include a robot identifier. The robot identifier may include a model of the robot 1302. The model may be a name, number, communication frequency, etc., which identifies the robot 1302. The robot identifier may be in the form of a unique identifier, which uniquely identifies the robot 1302.

Each robot 1302 may also include one or more robot capabilities. Robot capabilities may include an amount of memory the robot 1302 has available, an available processing power at the robot 1302, available battery life at the robot 1302, latency between the robot 1302 and receiving device, etc. Memory may be in the form of volatile or non-volatile memory. The amount of identified memory may include the amount of memory the robot 1302 has available at the time the robot identifier is sent to a computing device and/or cloud. In embodiments, the amount of memory may also include an average amount of memory the robot 1302 has available over a predefined time period. The available processor power may be related to the clock speed, number of available cores, number of threads, amount of cache, etc. Additional robot capabilities may include a measureable amount of wear and tear on the robot 1302, an age of the robot 1302, an amount of time the robot has been operating, a number of operational sensors at the robot, etc. One or more of the robot capabilities may be sent to a computing device and/or cloud.

In embodiments, the battery life of the robot 1302 may be used as a robot capability. The battery life may be the amount of battery life remaining when the robot capability is sent to a computing device or cloud. Optionally, the battery life may be a projected amount of battery life based on aggregate, historical, or current activities being performed by the robot 1302. In embodiments, the battery life may be based on an amount of time the robot's battery should last according to the robot's specifications. The robot's specifications may be stored in a manifest, for example.

The robot capability may include a latency. Latency may include the amount of delay experienced when sending data between two or more locations. In embodiments, the locations may be between the robot 1302 and a computing device and/or cloud. The latency may be one-way latency or round-trip latency. In embodiments, hardware access time may be included as part of the latency.

The robot 1302 may send information of all or a subset of the robot capabilities to a computing device and/or cloud. For example, a robot 1302 may send information of a latency between the robot 1302 and receiving device.

In addition to sending robot identifiers to a computing device and/or cloud, the robot 1302 may also send location inputs to a computing device and/or cloud. Location inputs may identify one or more obstacles within an area 1300 or within a predetermined distance 1308 of a robot 1302, for example. Location inputs may be gathered from (e.g., from maps) stored at the robot 1302. Additionally, location inputs may be gathered by one or more robots 1302 using any number of sensors. Example sensors include GPS receivers, infrared sensors, sonar, optical sensors, biosensors, RFID systems, NFC chips, wireless sensors, compasses, etc. One or more of these sensors may be used to gather data related to obstacles 1304, 1306. The gathered data may be sent from the robot 1302 to a computing device and/or cloud as one or more location inputs.

For example, a robot 1302 may use an optical sensor to detect and/or gather data about obstacles within a predefined radius 1308 of the robot 1302. The radius 1308 may vary between embodiments and the capabilities of the optical sensor. The optical sensor may detect an obstacle 1304 to the right of the robot 1302 and an obstacle 1306 in front of the robot 1302, for example. This location input data may be stored at the robot 1302 or sent to a computing device and/or cloud for storage. In embodiments, optical sensor location input data from multiple robots 1302 may be accumulated and even updated at the computing device and/or cloud.

Additional sensors, such as a GPS, may also be used to gather location inputs. The location inputs may be the GPS location of a robot 1302 in an area 1300, for example. In embodiments, the GPS location may be one or more coordinates. The GPS location may also or alternatively identify what direction the robot 1302 is facing and/or moving.

In further examples, the location inputs may be the GPS locations of one or more obstacles 1304, 1306 in the area 1300. This GPS location input data may be obtained by including GPS devices on one or more obstacles 1304, 1306, and transmitting each obstacle's 1304, 1306 GPS location to the robot, computing device, and/or cloud, for example. In embodiments, this GPS location input data may be used in conjunction with a map of the area 1300 to determine where the robot 1302 is relative to one or more of the obstacles 1304, 1306. Data from the GPS may be stored at the robot 1302 or sent to a computing device and/or cloud for storage. In embodiments, GPS location input data or other sensor data from multiple robots 1302 may be accumulated and even updated at the computing device and/or cloud.

Location inputs may be obtained from audio sensors, such as microphones. For example, a robot 1302 may include a microphone capable of receiving audio data including audio commands. The robot 1302, computing device, and/or cloud may use audio data from the microphone to determine the source of the audio, how far the source of the audio is away from the robot 1302, etc. This information can be used to identify the audio source as an obstacle, for example.

In embodiments, the audio may be identified as a command that identifies a direction for the robot 1302 to move, such as a left or right turn, or an affirmative command to do or refrain from doing something. Thus, a person 1310 may speak the word "stop" and the robot 1302 may use the audio to identify where the person 1310 is located and even respond to the audio command by stopping. Audio location input sensor data may be stored at the robot 1302 or sent to a computing device and/or cloud for storage. In embodiments, audio location input data from multiple robots 1302 may be accumulated and even updated at the computing device and/or cloud.

The amount of location inputs gathered and sent to a computing device and/or cloud may vary based on a number of factors. For example, in some embodiments, all location inputs may be gathered and sent to a computing device and/or cloud. Depending on the size of the area 1300, and the number and breadth of the sensors gathering data, this may result in a large amount of location data. As such, embodiments may limit the amount of location inputs that are collected. Example limitations may be based on, e.g., predetermined distances relative to the robot 1302. The predetermined distances may be defined in terms of metric or standard distances and may be unidirectional or multidirectional based on an orientation of the robot 1302, for example. The predetermined distances may be a certain number of inches or feet, for example. Optionally, the predetermined distances may be an entire room in a building or area on a map. Predetermined distances may also be conceptual. For example, predetermined distances may be defined according to the amount of available memory or other processing capabilities a robot 1302 has available for storing location input data on a temporarily or permanent basis. In embodiments, the available memory may include any sort of storage accessible by a processor of the robot with no more than the maximum amount of latency by which the robot is constrained to act in, for example.

In addition to sending robot identifiers and/or location inputs to a computing device and/or cloud, the robot 1302 may also send requests for information to a computing device and/or cloud. The requests may be in the form of requesting additional data about the robot's 1302 environment. For example, the robot 1302 may store a map about an area 1300, but may not know what is outside of the area 1300. Therefore, the robot 1302 may request a map of the hallway leading to the area 1300 from a computing device and/or cloud, for example. In embodiments, the requested map may replace or supplement the map stored at the robot 1302.

The robot 1302 may also send requests for computer-executable instructions to perform a desired task. Example tasks may include navigating to a location, opening a door, finding an object in the area 1300, etc. For example, the robot 1302 may sense that the robot is about to run into a table 1306. The robot 1302 may determine that running into the table 1306 is an adverse action (e.g., an action that hinders the mobility, safety, or general operation of the robot 1302.) In embodiments, the robot 1302 may have enough onboard logic to stop moving. However, the robot 1302 may not have enough onboard logic to avoid the table. Accordingly, the robot 1302 may identify the task of moving to avoid the table as a desired task and send a request to the computing device and/or cloud requesting computer-executable instructions to perform this task. Optionally, the robot 1302 may send one or more location inputs to the computing device and/or cloud that allow the computing device and/or cloud to deduce the desired task of stopping and/or moving to avoid the table. Both examples may result in a request for computer-executable instructions that will allow the robot 1302 to avoid the table.

Figure 14:
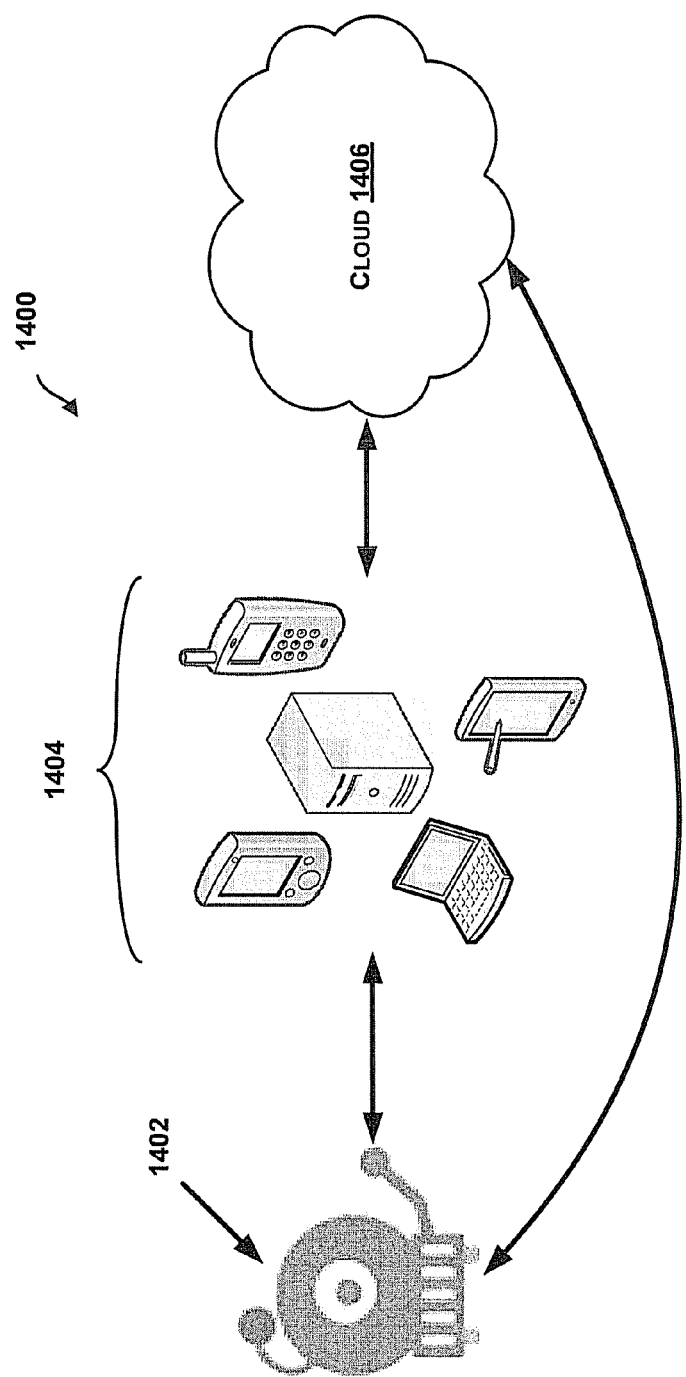
FIG. 14 is an example system in which robots may interact with the cloud directly or through a computing device.

FIG. 14 illustrates a system 1400 in which a robot 1402 may interact with a cloud 1406 directly or indirectly through a computing device 1404. In embodiments, the system 1400 may include more than one robot 1402. On a structural level, the robot 1402 may include a single microcontroller. A microcontroller may have fixed or dynamic functionalities. For example, the microcontroller may have fixed functionalities that may be defined by limited resources, such as processing capabilities, memory, etc. The limited resources may not be enough to allow the robot 1402 to perform a desired task. Therefore, to accomplish certain tasks, the robot 1402 may interact with one or more other devices, such as a computing device 1404 and/or cloud 1406. In embodiments, this interaction may be performed using dynamic functionalities at the microprocessor. Dynamic functionalities may allow the microcontrollers to be constantly in flux based on a prior history. Dynamic functionalities may also allow the microcontroller to communicate with a cloud 1406 to optimize for latency, available memory, etc. In this way, the computing device 1404 and/or cloud 1406 may act as a central knowledge base for the robot 1402.

A computing device 1404 may be any computer, computing machine, information processing system, etc. Example computing devices 1404 may include a cellular telephone, personal digital assistant, desktop computer, tablet computer, laptop computer, etc. In embodiments, the computing device may replace the microcontroller at the robot 1402. The computing device 1404 is configured to receive data, such as requests for information, requests for computer-executable instructions, robot identifiers, and location inputs, from a robot 1402. The computing device 1404 may send all or part of this information to a cloud 1406.

As described above, a "cloud" may refer to a service or a group of services accessible over a network (e.g., Internet) by client and server devices, for example. FIG. 1 illustrates a cloud in an exemplary system for cloud-based computing. Like the cloud 102 in FIG. 1, the cloud 1406 in FIG. 14 may include a cloud service, cloud platform, infrastructure, and database to perform one or more of the functions and/or processes described herein. The cloud 1406 is configured to receive data, such as robot identifiers and location inputs, from a robot 1402 and/or a computing device 1404.

The robot 1402 may send data, such as robot identifiers, robot capabilities, and location inputs, etc., to a cloud 1406 directly or indirectly via one or more computing devices 1404, for example. The determination as to whether the data should be sent directly or indirectly to the cloud may be made by a user or dictated by the system architecture. For example, some embodiments may include one or more computing devices in the system architecture, whereas, other embodiments may include no computing devices in the system architecture.

The computing device 1404 may receive, store, and/or filter data that is sent from the robot 1402. While the cloud 1406 may perform these same operations, using the computing device 1404 as an intermediary may allow the data to be stored at a local location and may reduce the amount of data that the robot 1402 may need to transfer at any given point. Moreover, if a connection to the cloud 1406 were to fail, the robot 1402 may still be able to operate at least in part by communicating with a computing device 1404.

In examples, a robot 1402 may send a plurality of location inputs identifying what objects are in a room. The computing device 1404 may receive the location inputs and store the location inputs in memory at the computing device. Once stored, the robot 1402 may not need to send location inputs again unless there is a change such as the robot 1402 enters a new room, for example. In such circumstances, the robot 1402 may send the computing device 1404 new location inputs, which may be saved by the computing device 1404. Based on the robot's desired task, all or part of the data stored at the computing device 1404 may be sent to the cloud 1406, for example.

The amount of data that is sent to the computing device 1404 and/or cloud 1406 may vary. For example, in embodiments, the computing device 1404 and/or cloud 1406 may receive all of the robot identifiers, robot capabilities, and/or location inputs from the robot 1402. The computing device 1404 and/or cloud 1406 may then process the received data to determine how much of the received data is needed, or conversely not needed, to accomplish the steps of method 1200, for example. Unneeded data may be discarded or stored on a temporary or permanent basis at the computing device 1404 and/or cloud 1406.

The computing device 1404 and/or cloud 1406 may aggregate data received from the robot 1402. For example, the robot 1402 may send information indicating that a set of computer-executable instructions that were supposed to route the robot 1402 around a table leg have failed. This failure, along with others, may be aggregated so that the robot 1402, computing device 1404, and/or cloud 1406 may deduce the reason for the failure and create a solution set of computer-executable instructions to address the failure. The solution may be to have the robot 1402 stop at a farther distance away from the table prior to proceeding onward, for example. In embodiments, this solution may be sent to those robots that have encountered the failure, a random set of robots in a fleet, all robots in a fleet, etc.

In another example, data from the robot 1402 may be aggregated to maintain a map of an area. For example, the computing device 1404 and/or cloud 1406 may receive location data from the robot 1402 that are or have been in an area. This location data may include the location of one or more obstacles within a room, for example. The location input data may be used to update a map of known obstacles within the area. This updated map may be shared with the robot 1402. This allows the robot 1402 to accumulate, store, and/or access knowledge without having to consume limited resources onboard the robot 1402.

When an intermediary computing device is used, all or a subset of the data that is received at the computing device 1404 may be sent to the cloud 1406. In embodiments, the process of sending data to the cloud 1406 may be similar to the process of sending data from the robot 1402 to the computing device 1404.

Once data is received at the cloud 1406, the cloud 1406 may compare the received data, such as the robot identifier, to a manifest stored in the cloud 1406 to determine the robot's processor type, amount of installed memory, storage space, type of operating system, type of sensors available to the robot, what type of wheels are installed on the robot, what direction(s) the robot is able to move, etc.

The cloud 1406 may also determine instructions for a robot 1402. The instructions, which may be computer executable, open source, created by users or persons in industry, etc. Example computer-executable instructions may include one or more sequential commands to control movement of the robot 1402, commands to initiate a sensor, commands to request specific robot identifiers and/or location inputs from the robot 1402, etc.

In embodiments, computer-executable instructions may not exist for every robot 1402 to accomplish every desired task. In such cases, the cloud 1406 may select a set of computer-executable instructions that accomplish a substantially similar task and/or are substantially similar to a different robot. For example, a robot 1402 may need to decrease in height to avoid an upcoming obstacle. While the robot 1402 may have the motor abilities to decrease in height, there may not be specific computer-executable instructions to accomplish that task for that specific robot 1402. However, the cloud 1406 may determine that there are multiple generic computer-executable instructions for causing the robot 1402 to decrease in height. The cloud 1406 may, therefore, select generic computer-executable instructions to accomplish the task.

In embodiments, the generic or specific computer-executable instructions may be modified in order to be executed by the robot 1402. The cloud 1406, computing device 1404, and/or robot 1402 may have the ability to modify computer-executable instructions. Modifications may be performed based on a robot's 1402 processor type, amount of installed memory, storage space, type of operating system, type of sensors available to the robot 1402, what type of wheels are installed on the robot 1402, what direction(s) the robot 1402 is able to move, etc. In embodiments, modifications may be performed by identifying one or more computer-executable instructions that the robot 1402 is unable to perform. For each of these computer-executable instructions, the cloud 1406, computing device 1404, or robot 1402 may determine if there exists similar or replacement computer-executable instructions. If so, the robot 1402 may use the similar or replacement computer-executable instructions to accomplish the desired task.

For example, a robot 1402 may need to move around an obstacle. The computer-executable instructions for performing this task may require the robot 1402 to make a sharp ninety degree left turn to avoid the obstacle. This requirement may presuppose that the robot 1402 that is going to execute the computer-executable instructions has omni wheels that allow the robot 1402 to move laterally to the left. The robot 1402, however, may only have wheels on a rigid axle. These more rigid wheels may be unable to perform the step of making a sharp ninety degree left turn. Accordingly, the cloud 1406, or even the computing device 1404 or robot 1402, may modify the computer-executable instructions based on the mobility of the robot 1402, for example. This may result in the robot 1402 moving backward two feet and slowly making a soft ninety degree turn to the left, for example.

Multiple sets or combinations of computer-executable instructions may exist for accomplishing a task. The process of determining which computer-executable instructions to send to the robot 1402 may include ranking one or more sets or combinations of computer-executable instructions. The ranking may be based on the computer-executable instructions that require the least number of resources, fewest number of robot components, involve the fewest number of instructions, etc. For example, a set of computer-executable instructions that requires the robot 1402 to decrease to a minimum height may be more optimal than a set of computer-executable instructions that requires a robot 1402 to stop, decrease in height by three inches, determine if the obstacle is still a problem, and decrease in height another three inches until the robot 1402 clears the obstacle. The computer-executable instructions may vary between the robot 1402, task, processing capabilities at the robot, etc.

After determining which computer-executable instructions to send to the robot 1402, the cloud 1406 may determine how many of the computer-executable instructions to send to the robot 1402 at one time. In embodiments, the cloud 1406 may send the robot 1402 all of the computer-executable instructions that the robot 1402 may need to complete the desired task. In another embodiment, the cloud 1406 may avoid sending all of the computer-executable instructions because the robot 1402 may be unable to process all of the computer-executable instructions and may, therefore, require multiple communications back and forth with the cloud 1406. In embodiments, multiple unneeded communications can be avoided when possible.

The number of computer-executable instructions sent to the robot 1402 at one time may depend on the amount of processing capabilities at the robot 1402. The processing capabilities may vary based on a number of factors including an amount of available memory on the robot, available processing power at the robot, remaining battery life at the robot, what computer-executable instructions are currently being executed, etc. One or more of these factors may be considered when determining how many of the computer-executable instructions to send to the robot 1402 at one time.

For example, a robot 1402 may have a limited amount of available memory. The cloud 1406 may determine how much memory is required to complete the computer-executable instructions. If the computer-executable instructions may be accomplished with the limited amount of available memory, the cloud 1402 may send all of the computer-executable instructions to the robot 1402. If the robot 1402 does not have enough memory to complete all of the computer-executable instructions, the cloud 1406 may determine how many computer-executable instructions may be sent without exceeding the limited amount of memory. This amount may be the maximum number of computer-executable instructions that the robot 1402 can handle. Optionally, this amount may be based on logical breaks in the computer-executable instructions wherein each logical break includes a subset of the computer-executable instructions that can be handled by the robot 1402. In embodiments, this amount may be based on what computer-executable instructions may need to be performed first. Those computer-executable instructions that may need to be performed first may be sent to the robot 1402 before those computer-executable instructions that may be performed second, for example.

In further embodiments, the cloud 1406 may send all or a subset of the computer-executable instructions to a computing device 1404. The computing device 1406 may, therefore, perform the duty of determining whether all of the computer-executable instructions may be sent to the robot 1402 or what subset of the computer-executable instructions may be sent to the robot 1402. Thus, the computing device 1406 may act as a buffer by downloading and maintaining a backlog of computer-executable instructions so that the robot 1402 may not have to rely on the cloud 1406 for instructions. This may be beneficial if the communication channel between the robot 1402 and cloud 1406 or between the computing device 1404 and cloud 1406 should ever fail.

After determining computer-executable instructions and determining what computer-executable instructions may be performed by the robot 1402, the computer-executable instructions may be sent from the cloud 1406 to the robot 1402 directly or indirectly via a computing device 1404. The rate in which the computer-executable instructions are sent to the robot 1402 may depend on the processing capabilities of the robot 1402, for example. The order in which the computer-executable instructions are sent to the robot 1402 may be sequential or may vary based on a priority. The priority may relate to the likelihood of the computer-executable instructions causing the robot 1402 to avoid an adverse action, such as an action that hinders the mobility, safety, or general operation of the robot 1402, for example.

In examples, the cloud 1406 may determine an order or priority in which to send data to the robot 1402. The order may be predefined within the cloud 1406 or may be determined or associated with the robot's 1402 surroundings, for example. In embodiments, there may be multiple levels of priority. For example, a first level of priority may be associated with a robot functionality that may be performed first, while a second level of priority may be associated with a robot functionality that may be performed at a subsequent time. Each of the levels of priority may include computer-executable instructions related to functionalities that may be performed by the robot 1402.

Computer-executable instructions related to a functionality having a first priority may be sent to the robot 1402 first. In embodiments, the amount of computer-executable instructions that are sent to the robot 1402 may be storable in the amount of available memory at the robot 1402. Optionally, a subset of the computer-executable instructions may be sent to the robot 1402, such that the available memory at the robot 1402 may be capable of storing the entire subset of the computer-executable instructions.

Upon sending computer-executable instructions having a first priority, the cloud 1406 may determine when to send computer-executable instructions related to the second priority. In embodiments, the cloud 1406 may send computer-executable instructions related to the second priority when the robot 1402 has completed the computer-executable instructions having the first priority. Alternatively, the second priority instructions, or a subset thereof, may be sent to the robot 1402 when memory becomes available at the robot 1402. The cloud 1406 may determine when robot 1402 may have available memory by periodically receiving a robot capability from the robot 1402 that may indicate the amount of available memory on the robot 1402. Optionally, the cloud 1406 may make this determination by estimating how many of the computer-executable instructions the robot 1402 should have executed during a given amount of time and how much memory the executed instructions should have taken on the robot 1402. From this data, the cloud 1406 may determine how much memory should be available at the robot 1402 to receive computer-executable instructions.

In an example, a robot 1402 may request instructions to move around a table. The cloud 1406 may determine computer-executable instructions that may allow the robot 1402 to navigate around the table and may also determine a priority for one or more of the computer-executable instructions. For example, a first priority may be given to stopping the robot 1402 to avoid any immediate damage to the robot. A second priority may be given to having the robot 1402 turn ninety degrees clockwise. A third priority may be given to moving forward two feet, thereby assuring that the robot 1402 has moved away from the table. A fourth priority may be given to turning the robot ninety degrees counterclockwise so that the robot 1402 is facing the original direction. A fifth priority may be given to moving the robot forward three feet to clear the table.

Computer-executable instructions may be sent to the robot 1402 (or to the computing device 1404 and then to the robot 1402) according to the determined priority. In embodiments, the robot 1402 may receive and execute one or more of the computer-executable instructions from the computing device 1404 and/or the cloud 1406. The robot 1402 may perform each computer-executable instruction in the order of priority determined by the cloud 1406 and, when finished with one or more of the computer-executable instructions, remove the computer-executable instruction from memory to make room for one or more new computer-executable instructions. In embodiments where the robot 1402 is unable to perform one or more computer-executable instructions, the robot 1402 may skip the computer-executable instruction and/or request new computer-executable instructions from a computing device 1404, cloud 1406, user, etc.

6. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method performed by a processor, the method comprising:
    receiving information from a robotic device, wherein the robotic device includes a mechanical actuator, wherein the information indicates an amount of available memory on the robotic device, a type of operating system on the robotic device, and a type of sensor available to the robotic device;
    determining data responsive to the information, wherein the data includes instructions executable by the robotic device;
    determining an order at which to send the data to the robotic device, wherein data associated with robot functionality to be performed at a first time is given a first priority and data associated with robot functionality to be performed at a subsequent time is given a second priority, wherein the first priority is higher than the second priority;
    adjusting the order based on the amount of available memory on the robotic device, the type of operating system on the robotic device, and the type of sensor available to the robotic device; and
    providing to the robotic device an amount of the data responsive to the information that is storable in the amount of available memory on the robotic device and in an order such that data that pertains to the first priority is sent first.

2. The method of claim 1, further comprising, based on the amount of available memory on the robotic device and the data that pertains to the first priority, determining when to provide the data that pertains to the second priority.

3. The method of claim 1, further comprising receiving a location input that indicates one or more obstacles within a predetermined distance of the robot.

4. The method of claim 1, further comprising:
    monitoring activity of the robotic device; and
    providing to the robotic device data that pertains to the second priority upon after about completion of the robot functionality to be performed at the first time.

5. The method of claim 1, further comprising:
    receiving a robot identifier from the robotic device;
    obtaining a robot specification associated with the robot identifier, wherein the robot specification indicates capabilities of the robotic device; and
    determining data responsive to the information and in accordance with the robot specification.

6. The method of claim 1, wherein the data that pertains to the first priority is associated with surroundings of the robotic device.

7. The method of claim 1, further comprising a server providing to the robotic device the data responsive to the information.

8. The method of claim 1, wherein the information received from the robotic device indicates at least one of an available battery power of the robotic device and an available processing power at the robotic device.

9. A system comprising:
    a robotic device, wherein the robotic device includes a mechanical actuator;
    a computing system including a non-transitory computer-readable medium; and
    program instructions stored on the non-transitory computer-readable medium and executable by at least one processor to:
        receive information from the robotic device, wherein the information indicates an amount of available memory on the robotic device, a type of operating system on the robotic device, and a type of sensor available to the robotic device;
        determine data responsive to the information;
        determine an order at which to send the data to the robotic device, wherein data associated with robot functionality to be performed at a first time is given a first priority and data associated with robot functionality to be performed at a subsequent time is given a second priority, wherein the first priority is higher than the second priority;
        adjust the order based on the amount of available memory on the robotic device, the type of operating system on the robotic device, and the type of sensor available to the robotic device; and
        provide to the robotic device an amount of the data responsive to the information that is storable in the amount of available memory on the robotic device and in an order such that data that pertains to the first priority is sent first.

10. The system of claim 9, further comprising program instructions stored on the non-transitory computer-readable medium and executable by at least one processor to provide to the robotic device data that pertains to the second priority upon completion of the robot functionality to be performed at the first time.

11. The system of claim 9, wherein the information received from the robotic device indicates an amount of available processing power at the robotic device.

12. The system of claim 9, wherein the information received from the robotic device indicates an available battery power of the robotic device.

13. The system of claim 9, wherein the data responsive to the information includes computer executable instructions that are executable to cause a movement of the robotic device.

14. The system of claim 9, wherein the information received from the robotic device is at least one of an optical sensor data and global positioning system sensor data.

15. A non-transitory computer-readable medium having stored thereon instructions executable by a computing device to cause the computing device to perform functions comprising:
- receiving information from a robotic device, wherein the information indicates an amount of available memory on the robotic device, a type of operating system on the robotic device, and a type of sensor available to the robotic device;
- determining data responsive to the information;
- determining an order at which to send the data to the robotic device, wherein data associated with robot functionality to be performed at a first time is given a first priority and data associated with robot functionality to be performed at a subsequent time is given a second priority, wherein the first priority is higher than the second priority;
- adjusting the order based on the amount of available memory on the robotic device, the type of operating system on the robotic device, and the type of sensor available to the robotic device; and
- providing to the robotic device an amount of the data responsive to the information that is storable in the amount of available memory on the robotic device and in an order such that data that pertains to the first priority is sent first.

16. The computer-readable medium of claim 15, further comprising instructions executable by the computing device for:
- receiving a robot identifier from the robotic device;
- obtaining a robot specification associated with the robot identifier, wherein the robot specification indicates capabilities of the robotic device; and
- determining data responsive to the information and in accordance with the robot specification.

17. The computer-readable medium of claim 16, wherein the capabilities of the robotic device include at least one of an available battery of the robotic device and an amount of available processing power of the robotic device.

18. The computer-readable medium of claim 15, further comprising instructions executable by the computing device for:
- monitoring activity of the robotic device; and
- providing to the robotic device data that pertains to the second priority uponafter about completion of the robot functionality to be performed at the first time.

19. The computer-readable medium of claim 15, further comprising instructions executable by the computing device for receiving a location input that indicates one or more obstacles within a predetermined distance of the robot, the predetermined distance being based on a size of a room in a building.

20. The computer-readable medium of claim 15, wherein the instructions executable by the computing device indicates a movement of the robotic device.

* * * * *